United States Patent
Sato et al.

(10) Patent No.: US 8,257,063 B2
(45) Date of Patent: Sep. 4, 2012

(54) REFRIGERANT COMPRESSOR

(75) Inventors: Hajime Sato, Aichi (JP); Yasuharu Maruiwa, Aichi (JP); Yoshiyuki Kimata, Aichi (JP); Yoshiaki Miyamoto, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 665 days.

(21) Appl. No.: 12/443,537

(22) PCT Filed: Jul. 22, 2008

(86) PCT No.: PCT/JP2008/063142
§ 371 (c)(1),
(2), (4) Date: Mar. 30, 2009

(87) PCT Pub. No.: WO2009/014124
PCT Pub. Date: Jan. 29, 2009

(65) Prior Publication Data
US 2010/0111705 A1 May 6, 2010

(30) Foreign Application Priority Data
Jul. 23, 2007 (JP) ................................ 2007-191085

(51) Int. Cl.
*F04B 35/04* (2006.01)
(52) U.S. Cl. ........... 417/423.13; 417/423.9; 417/423.11; 417/423.12; 417/423.14
(58) Field of Classification Search ............... 417/423.1, 417/423.8, 423.9, 423.11–423.14
See application file for complete search history.

(56) References Cited

U.S. PATENT DOCUMENTS

| | | | |
|---|---|---|---|
| 7,367,190 B2* | 5/2008 | Shibui et al. | 60/608 |
| 2003/0133814 A1* | 7/2003 | Sishtla | 417/423.12 |
| 2007/0036664 A1* | 2/2007 | Shibui et al. | 417/407 |
| 2010/0266430 A1* | 10/2010 | Shimizu | 417/423.8 |

FOREIGN PATENT DOCUMENTS

JP 61-9674 U 1/1986
(Continued)

OTHER PUBLICATIONS

International Search Report of PCT/JP2008/063142, Mailing Date of Aug. 26, 2008.

*Primary Examiner* — Bumsuk Won
(74) *Attorney, Agent, or Firm* — Westerman, Hattori, Daniels & Adrian, LLP (57) ABSTRACT

A refrigerant compressor is provided that can be assembled easily and can quickly discharge lubricating oil that leaks from contact sliding parts of its mechanical seal so as to prevent the oil from turning into sludge around the stationary ring. In a refrigerant compressor in which a mechanical seal which shaft seals the inner side and the outer side of a housing is installed at a portion of the housing through which a rotating shaft penetrates, a mechanical seal comprises a stationary ring securely fastened to the inner circumferential surface of a boss portion, a rotary ring securely fastened to the outer circumferential surface of the rotating shaft to the inside of the stationary ring so as to face the stationary ring, whereby sliding contact is formed between sides of the stationary ring and the rotary ring. The inner circumferential surface of the boss portion to the outside of the stationary ring is provided with an inclined portion over the entire circumference or at least the gravitationally lower portion of the inner circumferential surface, which enlarges from the stationary ring side toward an oil discharge hole to the outside of the stationary ring.

12 Claims, 5 Drawing Sheets

FOREIGN PATENT DOCUMENTS

| | | |
|---|---|---|
| JP | 63-130679 U | 8/1988 |
| JP | 6-49798 U | 7/1994 |
| JP | 9-105382 A | 4/1997 |
| JP | 11-351146 A | 12/1999 |
| JP | 2004-136411 A | 5/2004 |
| JP | 2006-242061 A | 9/2006 |

* cited by examiner

REFRIGERANT COMPRESSOR

TECHNICAL FIELD

The present invention relates to a refrigerant compressor in which a mechanical seal is installed between the inner circumferential surface of a boss portion and the outer circumferential surface of a rotating shaft in a housing through which a rotating shaft penetrates, and shaft seals the inner side and the outer side (atmosphere side) of the housing.

BACKGROUND ART

Among refrigerant compressors, what is called an open-type refrigerant compressor has a housing in which a compression mechanism is accommodated and a rotating shaft one end of which protrudes from the housing toward the outside so that it is driven by an external drive source. In such an open-type refrigerant compressor, the portion of the housing through which the rotating shaft penetrates needs to be sealed so that the interior of the housing is hermetically sealed from the atmosphere. A mechanical seal has come to be used for the sealing, as high pressure refrigerants such as R410A and $CO_2$ have come to be used recently. The mechanical seal commonly has a stationary ring securely fastened to the housing and a rotary ring securely fastened to the rotating shaft. The mechanical seal is configured so that the rotary ring and the stationary ring are spring pressured into sliding contact with each other over a relatively small area, which achieves the shaft sealing function.

The high pressure refrigerant R410A has operating pressure about 1.5 times to 4 times higher than, for example, R407c and R134a, so it tends to result in a greater amount of heat generated at the contact sliding parts of the mechanical seal. On the other hand, even the mechanical seal is not free from leakage of lubricating oil from the contact sliding parts, and there are cases in which a very small amount of lubricating oil leaks out. When the lubricating oil that leaks from the contact sliding parts stays around the stationary ring, the lubricating oil degrades because it is exposed to the high temperature generated at the contact sliding parts, turning into sludge, which is deposited around the stationary ring. The sludge deposited in this way may be caught in the contact sliding gap. This may damage the contact sliding parts and can bring about problems such as degradation of the shaft seal and increase of lubricating oil leakage.

In view of this, in order to prevent the lubricating oil leaking from the sliding surfaces from staying around the sliding surfaces and turning into sludge, Patent Reference 1 discloses a refrigerant compressor having the configuration as follows. An oil accommodating space is formed further inward than the contact sliding parts by a rotary ring, a stationary ring, and the outer circumferential surface of a rotating shaft. An oil supply passage provided in the rotating shaft is provided with an opening into this space, so as to form a path through which oil is circulated at all times. This circulation of the oil is intended to prevent drying out of the oil and generation of blisters at the contact sliding parts, and generation of sludge around the contact sliding parts. Moreover, it is intended to move the oil leaking from the contact sliding parts in a direction away from the vicinity of the contact sliding parts by a centrifugal force so as to prevent building up of sludge resulting from the oil staying around the contact sliding parts.

Patent Reference 1: Japanese Unexamined Patent Application, Publication No. 2006-242061

DISCLOSURE OF INVENTION

However, the invention disclosed in Patent Reference 1 employs a configuration in which the stationary ring that is securely fastened to the inner circumferential surface of the boss portion of the housing is installed in the inner side of the housing, and at the outer side thereof, the rotary ring is securely fastened to the outer circumference of the rotating shaft so as to face the stationary ring, in order to form a oil accommodating space further inward than the contact sliding parts. For this reason, it is necessary that when assembling this, one end of the rotating shaft should be inserted into the boss portion of the housing to which the stationary ring has been securely fastened, and thereafter the rotary ring should be inserted from the outer side of the boss portion and securely fastened to the outer circumference of the rotating shaft. Therefore, the problem arises that the assembling process is difficult.

Moreover, it is necessary to form an oil circulation passage that passes through the oil accommodating space. This becomes a design constraint. In addition, since the oil supply direction of the oil to the contact sliding parts is from the center of the mechanical seal toward the outer circumference of the mechanical seal, it is necessary to process the discharge surface so that it allows the leaked oil to easily move away from the vicinity of the contact sliding parts, which requires the same processing accuracy as for a surface facing the sliding surface of the stationary ring side face, so the problem arises that the processing is difficult. Another problem is that although the above-described effect may be expected in the case of the configuration in which the oil supply direction to the contact sliding parts is from the center toward the outer circumference of the mechanical seal, a sufficient effect cannot be expected where the oil supply direction is from the outer circumference toward the center.

The invention has been accomplished in view of these circumstances, and it is an object of the invention to provide a refrigerant compressor that can be assembled easily and that in devices where the direction of oil supply to the contact sliding parts of the mechanical seal is from the outer circumferential side toward the center side quickly discharges lubricating oil that leaks from contact sliding parts of its mechanical seal so as to prevent the oil from turning into sludge around the stationary ring.

In order to solve the foregoing problems, a refrigerant compressor of the invention adopts the following means.

A first aspect of the invention provides a refrigerant compressor comprising a mechanical seal which is installed between the inner circumferential surface of a boss portion of a housing through which a rotating shaft penetrates and the outer circumferential surface of the rotating shaft and which shaft seals the inner side and the outer side of the housing, and an oil discharge hole which is provided to the outside of the mechanical seal of the boss portion and which discharges leaked oil to outside, characterized in that: the mechanical seal comprises a stationary ring securely fastened to the inner circumferential surface of the boss portion, and a rotary ring securely fastened to the outer circumferential surface of the rotating shaft and to the inside of the stationary ring so as to face the stationary ring and to form a contact sliding area between the surfaces of the stationary ring and the rotary ring that face each other; and the inner circumferential surface of the boss portion that is outside of the stationary ring is made to be inclined over its entirety or at least at a gravitationally lower portion, enlarging from the stationary ring side toward the oil discharge hole at its outer side.

In the refrigerant compressor according to the first aspect, the rotary ring securely fastened to the outer circumference of the rotating shaft is provided to the inside of the stationary ring securely fastened to the inner circumferential surface of the boss portion of the housing. Therefore, when assembling, the mechanical seal may be assembled merely by fitting the rotating shaft, to which the rotary ring has been securely fastened, into the inner circumference of the stationary ring securely fastened to the inner circumferential surface of the boss portion. Thus, assembling of the compressor can be simplified. Moreover, outside the outer circumference of the contact sliding parts of the stationary ring and the rotary ring is an oil and/or refrigerant atmosphere, and the direction of oil supply to the contact sliding parts is from the outer circumference toward the center of the mechanical seal. Accordingly, the lubricating oil inside the housing leaks out from the inner circumferential surface of the stationary ring. This leaked oil can be guided to the oil discharge hole and discharged therefrom quickly by the inclined portion provided in the inner circumferential surface of the boss portion. Thus, the leaked oil does not stay around the stationary ring, and it is not exposed to a high temperature. Therefore, it is possible to resolve the problems in the prior art such as acceleration of lubricating oil leakage and the degradation in the shaft sealing capability caused by the leaked oil turning into sludge, building up, and being caught between the contact sliding parts. The invention prevents leaked oil from turning into sludge, which is an advantageous effect especially since the current trend in compressors is toward the use of a high pressure refrigerant increases the amount of heat generated at the contact sliding portions.

The refrigerant compressor according to the first aspect may employ a configuration wherein the inner circumferential surface of the boss portion comprises an annular stepped portion, the stationary ring is securely fastened to an inner side of the annular stepped portion, and the inclined; portion is provided in the inner circumferential surface of the annular stepped portion.

With this configuration, the leaked oil from the mechanical seal can be guided to the oil discharge hole and discharged to the outside by the inclined portion provided in the inner circumferential surface of the annular stepped portion, in the case that the stationary ring is securely fastened via the annular stepped portion provided in the inner circumferential surface of the boss portion. Accordingly, this can also resolve the problems caused by the leaked oil staying around the stationary ring, turning into sludge, and building up there.

Any one of the above-described refrigerant compressors may employ a configuration wherein the stationary ring comprises a second inclined portion in which an entirety of or at least the gravitationally lower portion of the inner circumferential surface of the stationary ring gradually enlarges from the vicinity of the rotary ring toward the outside.

This configuration makes it possible to guide and discharge the leaked oil from the mechanical seal to the oil discharge hole more quickly by the second inclined portion provided in the inner circumferential surface of the stationary ring. Thereby, it is possible to prevent degradation in the sealing capability and acceleration of lubricating oil leakage, which are caused by leaked oil that staying around the stationary ring, turning into sludge, and building up there.

The above-described refrigerant compressor may employ a configuration wherein the inclined portion provided in the inner circumferential surface of the boss portion and the second inclined portion provided in the stationary ring form a continuous surface.

This configuration makes it possible to guide the leaked oil from the mechanical seal to the oil discharge hole by the inclined portion of the inner circumferential surface of the boss portion and the second inclined portion provided in the inner circumferential surface of the stationary ring and discharge it to the outside quickly, because the two inclined portions form a continuous surface. Thus, the time from the leakage of oil from the mechanical seal until that oil reaches the oil discharge hole can be shortened, and the deposition of the leaked oil because it has turned into sludge can be prevented reliably.

Any one of the above-described refrigerant compressors may employ a configuration wherein the oil discharge hole is provided so as to open in the inclined portion.

According to the invention, the leaked oil flowing outward along the inclined portion can be discharged directly into the oil discharge hole that is opened in the inclined portion. Therefore, the stagnation time of the leaked oil can be further shortened, and the leaked oil can be discharged to the outside more quickly.

In accordance with a second aspect of the invention, the invention provides a refrigerant compressor comprising a mechanical seal which is installed between the inner circumferential surface of a boss portion of a housing through which a rotating shaft penetrates and the outer circumferential surface of the rotating shaft and which shaft seals the inner side and the outer side of the housing, and an oil discharge hole which is provided further outward than the mechanical seal of the boss portion and which discharges leaked oil to outside, characterized in that: the mechanical seal comprises a stationary ring securely fastened to the inner circumferential surface of the boss portion, and a rotary ring securely fastened to the outer circumferential surface of the rotating shaft at a portion inside of the stationary ring so as to face the stationary ring and form a contact sliding area where surfaces of the stationary ring and the rotary ring face each other; and the inner diameter of the contact sliding portion of the rotary ring and the inner diameter of the inner circumferential surface of the stationary ring or the inner diameter of at least the gravitationally lower portion of the inner circumferential surface are substantially equal to each other.

In the refrigerant compressor according to the second aspect, the rotary ring securely fastened to the outer circumference of the rotating shaft is provided to the inside of the stationary ring securely fastened to the inner circumferential surface of the boss portion of the housing. Therefore, when assembling, the mechanical seal may be assembled merely by fitting the rotating shaft, to which the rotary ring has been securely fastened, into the inner circumference of the stationary ring securely fastened to the inner circumferential surface of the boss portion. Thus, assembling of the compressor can be simplified. Moreover, at the sides of the stationary ring and the rotary ring opposite from the contact sliding parts is an oil and/or refrigerant atmosphere, and the oil supply direction to the contact sliding parts is a direction from the outer circumferential side of the mechanical seal toward the center side. Accordingly, the lubricating oil inside the housing leaks out to the inner circumferential surface side of the stationary ring. However, since the inner diameter of the contact sliding part of the rotary ring and the inner diameter of the inner circumferential surface or the inner diameter of at least a gravitationally lower portion of the inner circumferential surface of the stationary ring are substantially equal to each other, the leaked oil flows outward and is discharged to outside from the oil discharge hole and does not remain in the space between the contact sliding part of the rotary ring and the stationary ring. Thus, the leaked oil does not stay around the stationary ring, and it is not exposed to a high temperature. Therefore, it is possible to resolve the problems such as degradation in the shaft sealing capability and acceleration of lubricating oil leakage caused by the leaked oil turning into sludge, building up, and being caught between the contact sliding parts. The invention prevents leaked oil from turning into sludge, which is an advantageous effect especially since the current trend toward use of a high pressure refrigerant tends to increase the amount of heat generated at the contact sliding portions.

The refrigerant compressor according to the second aspect may employ a configuration wherein the inner diameter of the entire inner circumference or at least the gravitationally lower portion of the inner circumference of the stationary ring gradually enlarges from the rotary ring toward the oil discharge hole located to the outside of the rotary ring.

This configuration allows the leaked oil from the mechanical seal to flow outward along the portion of the inner circumferential surface of the stationary ring that gradually enlarges in inner diameter from the vicinity of the rotary ring toward the oil discharge hole to the outside of the stationary ring quickly and thus be discharged from the oil discharge hole to the outside. As a result, the leaked oil does not stay around the stationary ring, and it is possible to resolve the problems caused by the leaked oil remaining around the stationary ring, turning into sludge, and building up.

Any one of the foregoing refrigerant compressors of the second aspect may employ a configuration wherein the expression $(D1-D2)/D1 \leqq 0.07$ is satisfied, where D1 is the inner diameter of the contact sliding portion of the rotary ring and D2 is the inner diameter of the inner circumferential surface or the inner diameter of at least the gravitationally lower portion of the inner circumferential surface of the stationary ring.

This configuration can prevent the leaked oil from remaining in the space between the contact sliding part of the rotary ring and the inner circumferential surface of the stationary ring. Accordingly, it is possible to resolve the problems caused by the leaked oil remaining around the stationary ring, turning into sludge, and building up.

A third aspect of the invention provides a refrigerant compressor comprising a mechanical seal which is installed between the inner circumferential surface of a boss portion of a housing through which a rotating shaft penetrates and the outer circumferential surface of the rotating shaft and which shaft seals the inner side and the outer side of the housing, and an oil discharge hole which is provided to the outside of the mechanical seal of the boss portion and which discharges leaked oil to the outside, characterized in that: the mechanical seal comprises a stationary ring securely fastened to an inner circumferential surface of the boss portion, and a rotary ring securely fastened to the outer circumferential surface of the rotating shaft to the inside of the stationary ring so as to face the stationary ring and to form a contact sliding part between the sides of the stationary ring and the rotary ring that face each other; and the rotating shaft has a helical portion for transporting the leaked oil to the oil discharge hole with rotation of the rotating shaft, the helical portion provided over the entirety of the outer circumferential surface or over a portion thereof, extending from a position to the outside of the rotary ring to the oil discharge hole.

In the refrigerant compressor according to the third aspect, the rotary ring securely fastened to the outer circumference of the rotating shaft is provided to the inside of the stationary ring securely fastened to the inner circumferential surface of the boss portion of the housing. Therefore, when assembling, the mechanical seal may be assembled merely by fitting the rotating shaft, to which the rotary ring has been securely fastened, into the inner circumference of the stationary ring securely fastened to the inner circumferential surface of the boss portion. Thus, assembling of the compressor can be simplified. Moreover, at the sides of the stationary ring and the rotary ring opposite from the contact sliding sides is an oil and/or refrigerant atmosphere, and the oil supply direction to the contact sliding portion is a direction from the outer circumferential side of the mechanical seal toward the center side. Accordingly, the lubricating oil inside the housing leaks out to the inner circumferential surface side of the stationary ring. This leaked oil can be transferred to the oil discharge hole and discharged therefrom quickly by the helical portion provided on the outer circumferential surface of the rotating shaft. Thus, the leaked oil does not stay around the stationary ring, and it is not exposed to a high temperature. Therefore, it is possible to resolve the problems of the prior art such as degradation in the shaft sealing capability and acceleration of lubricating oil leakage caused by the leaked oil turning into sludge, building up, and being caught between the contact sliding portions. The invention prevents leaked oil from turning into sludge, which is an advantageous effect especially since the current trend is toward increased use of a high pressure refrigerant, which increases the amount of heat generated at the contact sliding portions.

In accordance with a fourth aspect, the invention provides a refrigerant compressor comprising a mechanical seal, which is installed between the inner circumferential surface of a boss portion of a housing through which a rotating shaft penetrates and the outer circumferential surface of the rotating shaft and which shaft seals the inner side and the outer side of the housing, and an oil discharge hole which is provided to the outside of the mechanical seal of the boss portion an which discharges leaked oil to outside, characterized in that: the mechanical seal comprises a stationary ring securely fastened to an inner circumferential surface of the boss portion, and a rotary ring securely fastened to an outer circumferential surface of the rotating shaft at an inner side of the stationary ring so as to oppose the stationary ring and to form contact sliding portions at the sides of the stationary ring and the rotary ring that oppose each other; and a temperature sensor is provided on the stationary ring or in the vicinity of installation location thereof so that rotation of the rotating shaft is stopped or decelerated when a detected value of the temperature sensor is equal to or higher than a predetermined temperature.

In the refrigerant compressor according to the fourth aspect, the rotary ring securely fastened to the outer circumference of the rotating shaft is provided at the inner side of the stationary ring securely fastened to the inner circumferential surface of the boss portion of the housing. Therefore, when assembling, the mechanical seal may be assembled merely by fitting the rotating shaft, to which the rotary ring has been securely fastened, onto the inner circumference of the stationary ring securely fastened to the inner circumferential surface of the boss portion. Thus, assembling of the compressor can be simplified. Moreover, at the sides of the stationary ring and the rotary ring opposite from the contact sliding sides is an oil and/or refrigerant atmosphere, and the direction of oil supply to the contact sliding direction is away from the outer circumference of the mechanical seal and toward the center. Accordingly, the lubricating oil inside the housing leaks out to the inner circumferential surface side of the stationary ring. However, rotation of the rotating shaft is stopped or decelerated when the temperature of the stationary ring or in the vicinity of the installation location thereof becomes equal to or higher than a predetermined temperature. Therefore, the temperature increase due to the heat generation of the vicinity of the stationary ring can be suppressed. Thus, the leaked oil does not stay around the stationary ring, and it is not exposed to a high temperature. Therefore, it is possible to resolve the problems of the prior art, such as degradation in the shaft sealing capability and acceleration of lubricating oil leakage caused by the leaked oil turning into sludge, building up, and being caught between the contact sliding portions. The invention prevents leaked oil from turning into sludge, which is an advantageous effect especially since the current trend is toward increased use of a high pressure refrigerant, which increases the amount of heat generated at the contact sliding portions.

In accordance with a fifth aspect, the invention provides a refrigerant compressor comprising a mechanical seal which is installed between the inner circumferential surface of a boss portion of a housing through which a rotating shaft penetrates and the outer circumferential surface of the rotating shaft and which shaft seals the inner side and the outer side of the housing, and an oil discharge hole which is provided to the outside of the mechanical seal of the boss portion and which discharges leaked oil to outside, characterized in that: the mechanical seal comprises a stationary ring securely fastened to an inner circumferential surface of the boss portion, and a rotary ring securely fastened to the outer circumferential surface of the rotating shaft at the area to the inside of the stationary ring so as to face the stationary ring and to have sliding contact between the sides of the stationary ring and the rotary ring that face each other; and cooling means for cooling the stationary ring and the rotary ring of the mechanical seal is provided at the outer side of the stationary ring.

In the refrigerant compressor according to the fifth aspect, the rotary ring securely fastened to the outer circumference of the rotating shaft is provided at the inner side of the stationary ring securely fastened to the inner circumferential surface of the boss portion of the housing. Therefore, when assembling, the mechanical seal may be assembled merely by fitting the rotating shaft, to which the rotary ring has been securely fastened, onto the inner circumference of the stationary ring securely fastened to the inner circumferential surface of the boss portion. Thus, assembling of the compressor can be simplified. Moreover, at the sides of the stationary ring and the rotary ring opposite from the contact sliding sides is an oil and/or refrigerant atmosphere, and the direction of oil supply to the contact sliding parts is away from the outer circumference of the mechanical seal toward the center. Accordingly, the lubricating oil inside the housing leaks out at the inner circumference of the stationary ring. However, the stationary ring and the rotary ring of the mechanical seal can be cooled by the cooling means provided on the outer side of the stationary ring, so the temperature increase due to the heat generation in the vicinity of the stationary ring can be suppressed. Thus, the leaked oil does not stay around the stationary ring, and it is not exposed to a high temperature. Therefore, it is possible to resolve the problems of the prior art such as degradation in the shaft sealing capability and acceleration of lubricating oil leakage caused by the leaked oil turning into sludge, building up, and being caught between the contact sliding portions. The invention prevents leaked oil from turning into sludge, which is an advantageous effect especially since the current trend is toward increased use of a high pressure refrigerant, which increases the amount of heat generated at the contact sliding portions.

In the refrigerant compressor according to the fifth aspect, the cooling means may comprise a blower blade attached to the rotating shaft.

With this configuration, the cooling means may be configured easily by merely attaching blower blades onto the rotating shaft. Therefore, the stationary ring and the rotary ring of the mechanical seal can be cooled forcibly as long as the rotating shaft keeps rotating. As a result, it is possible to prevent the leaked oil from staying around the stationary ring, being exposed to a high temperature, turning into sludge, and building up.

The refrigerant compressor according to the sixth aspect provides a refrigerant compressor comprising a mechanical seal which is installed between the inner circumferential surface of a boss portion of a housing through which a rotating shaft penetrates and the outer circumferential surface of the rotating shaft and which shaft seals the inner side and the outer side of the housing, and an oil discharge hole which is provided to the outside of the mechanical seal of the boss portion and which discharges leaked oil to outside, characterized in that: the mechanical seal comprises a stationary ring securely fastened to the inner circumferential surface of the boss portion, and a rotary ring securely fastened to the outer circumferential surface of the rotating shaft at an area to the inside of the stationary ring so as to face the stationary ring and thus form sliding contact between the sides of the stationary ring and the rotary ring that face each other; and a cooling fin is provided on the side of the stationary ring opposite from the rotary ring and/or the inner circumferential surface of the stationary ring, integrally with or separately from the stationary ring.

In the refrigerant compressor according to the sixth aspect, the rotary ring securely fastened to the outer circumference of the rotating shaft is provided at the inner side of the stationary ring securely fastened to the inner circumferential surface of the boss portion of the housing. Therefore, when assembling, the mechanical seal may be assembled merely by fitting the rotating shaft, to which the rotary ring has been securely fastened, into the inner circumference of the stationary ring securely fastened to the inner circumferential surface of the boss portion. Thus, assembling of the compressor can be simplified. Moreover, at the sides of the stationary ring and the rotary ring opposite from the contact sliding sides is an oil and/or refrigerant atmosphere, and the direction of oil supply to the contact sliding parts is away from the outer circumference of the mechanical seal toward the center. Accordingly, the lubricating oil inside the housing leaks out at the inner circumferential surface of the stationary ring. However, the heat generated can be released to the outside quickly by the cooling fin provided on the side of the stationary ring opposite from the rotary ring and/or the inner circumferential surface of the stationary ring, so the temperature increase in the vicinity of the stationary ring can be suppressed. Thus, the leaked oil does not stay around the stationary ring, and it is not exposed to a high temperature. Therefore, it is possible to resolve the problems of the prior art such as degradation in the shaft sealing capability and acceleration of lubricating oil leakage caused by the leaked oil turning into sludge, building up, and being caught between the contact sliding portions. The invention prevents leaked oil from turning into sludge, an advantageous effect especially since the current trend is toward increased use of a high pressure refrigerant, which increases the amount of heat generated at the contact sliding portions.

Assembling of the compressor according to the invention can be done easily. Moreover, the lubricating oil leaking from the mechanical seal can be quickly guided to the oil discharge hole and discharged therefrom, or the temperature increase due to the heat generation in the vicinity of the stationary ring from which the lubricating oil leaks out can be suppressed. Therefore, the leaked oil does not stay around the stationary ring of the mechanical seal, and it is not exposed to a high temperature. Thus, it is possible to resolve the problems of the prior art such as degradation in the shaft sealing capability and acceleration of the lubricating oil leakage caused by the leaked oil turning into sludge, building up, and being caught between the contact sliding parts. The invention prevents leaked oil from turning into sludge, which is an advantageous effect especially since the current trend is toward increased use of a high pressure refrigerant, which increases the amount of heat generated at the contact sliding portions.

EXPLANATION OF REFERENCE 1 scroll compressor (refrigerant compressor)
2 housing
7 drive unit housing
7A boss portion
25 rotating shaft
30 mechanical seal
41 stationary ring
41A inclined portion (second inclined portion)
43 sliding surface
44 rotary ring
45 sliding protuberance
49 annular stepped portion
49A inclined portion
51 oil discharge hole
51A opening
52 helical groove (helical portion)
53 temperature sensor
54 cooling means
54A blower blade
55 cooling fin
D1 inner diameter of the sliding protuberance
D2 inner diameter of the stationary ring

BEST MODE FOR CARRYING OUT THE INVENTION

Hereinbelow, preferred embodiments of the invention will be described with reference to the drawings.

First Embodiment

Hereinbelow, a first embodiment of the invention will be described with reference to FIGS. 1 and 2.

Figure 1:
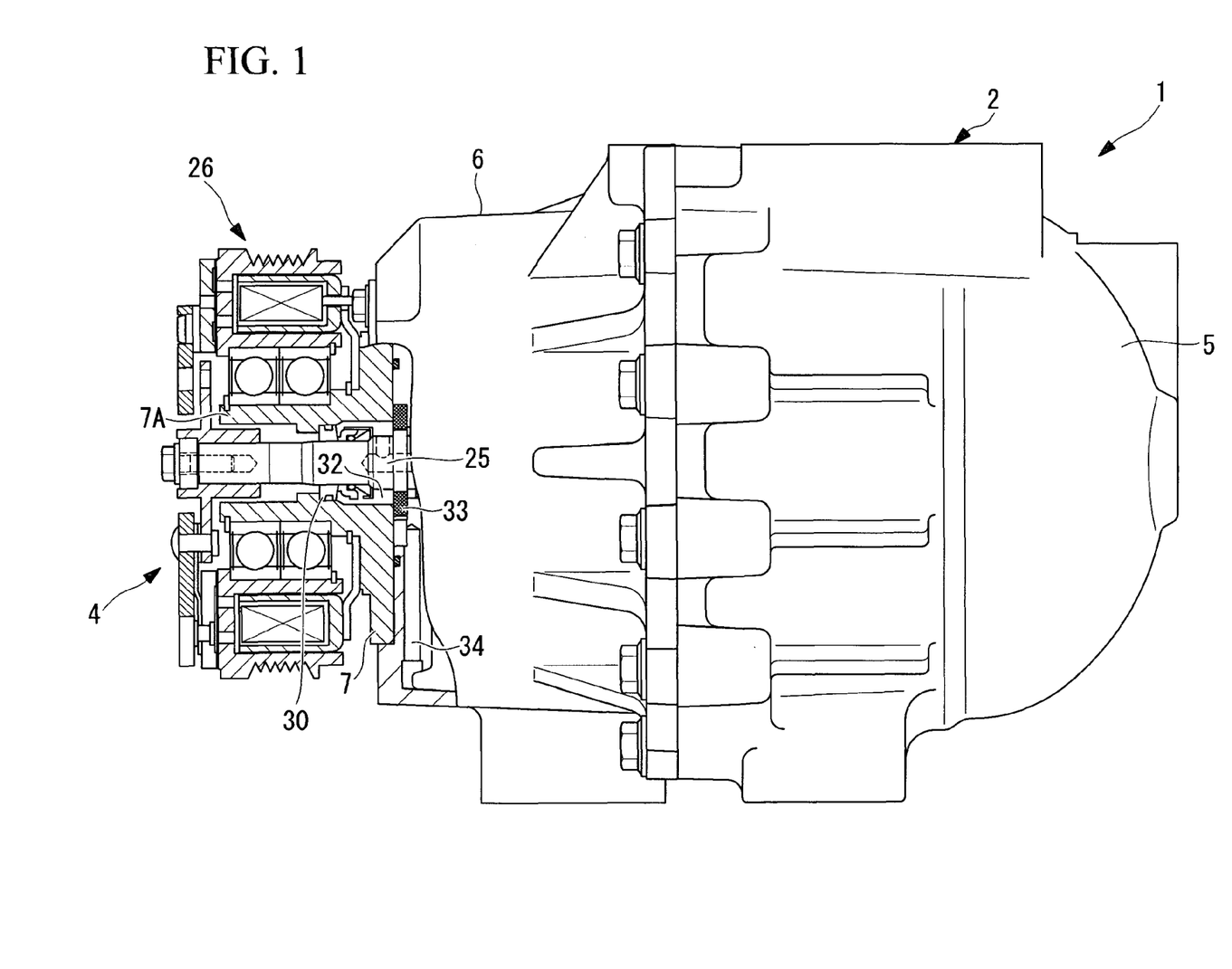
FIG. 1 is a vertical cross-sectional view of a scroll compressor, which is one example of a refrigerant compressor according to a first embodiment of the invention.

FIG. 1 shows the outer appearance, partly in section, of a refrigerant compressor according to the first embodiment of the invention. A refrigerant compressor 1 has a cylindrical housing 2 extending horizontally. The housing 2 is constructed by integrally coupling a rear housing 5, a front housing 6, and a drive unit housing 7.

A compression mechanism, not shown, for compressing refrigerant gas is incorporated in the internal space of the housing 2. This compression mechanism may be any type of compression mechanism, such as a publicly-known swash plate type, a rotary type, or a scroll type compression mechanism. The housing 2 is provided with a suction port, not shown, for sucking a low-pressure refrigerant gas, and a discharge port, not shown, for discharging the high-temperature and high-pressure refrigerant gas that has been compressed. In the interior of the housing 2, a rotating shaft 25 for driving the compression mechanism is supported freely rotatably by a bearing.

The rotating shaft 25 has such a length that its front end side penetrates through the front housing 6 and the drive unit housing 7 and extends to an end of a boss portion 7A of the drive unit housing 7, and the front end portion protrudes into an outer side (atmosphere side). An electromagnetic clutch 26 is attached to the front end portion of the rotating shaft 25. In addition, a mechanical seal 30 which shaft seals the portion of the housing through which the rotating shaft 25 penetrates, hermetically sealing the inner side and the outer side (atmosphere side) of the housing 2, is provided between the outer circumferential surface of the rotating shaft 25 and the inner circumferential surface of the boss portion 7A of the drive unit housing 7. A pulley portion of the electromagnetic clutch 26 is attached rotatably to the outer circumference of the drive unit housing 7 via a bearing, and it is configured so as to be belt-driven by an external drive source, not shown, with the rotating shaft 25 being driven when the clutch is on.

An oil reservoir 32 is formed to the inside of the mechanical seal 30. In addition, an oil pump 33 is attached to the rotating shaft 25, immediately to the rear of the drive unit housing 7. A suction hole 34 for allowing a suction part of the oil pump 33 and a lower part of the interior of the housing 2 to communicate with each other is provided in the front housing 6. The oil pump 33 is driven by rotation of the rotating shaft 25, so that it sucks the lubricating oil accumulated in the lower part of the housing 2 through the suction hole 34 and discharges the oil to the oil reservoir 32. Then, the oil is supplied to the bearing and so forth through an oil supply port, not shown, provided inside the rotating shaft 25.

In the refrigerant compressor 1, the rotating shaft 25 is rotationally driven when the electromagnetic clutch 26 is turned on. The compression mechanism is driven by rotation of the rotating shaft 25. It sucks a low-pressure refrigerant gas from a suction port (not shown), compresses the gas to a high temperature and high pressure, and discharges the compressed gas to the outside through a discharge port, not shown. The oil pump 33 is actuated at the same time as the rotation of the rotating shaft 25, so that it sucks the lubricating oil which has accumulated in the lower part of the housing 2 through the suction hole 34 and pumps it up to the oil reservoir 32. This lubricating oil is supplied to provide lubrication to locations that require lubrication such as bearings at the rear through an oil supply port, not shown. The mechanical seal 30 that constitutes the front end portion of the oil reservoir 32 also constitutes a path for the lubricating oil that is sent to the rear. Therefore, the lubricating oil is supplied to the mechanical seal 30 at all times. Thereby, the mechanical seal 30 is lubricated and cooled sufficiently.

Next, the mechanical seal 30 and its surrounding part, which form the primary parts of the present embodiment, will be described.

Figure 2:
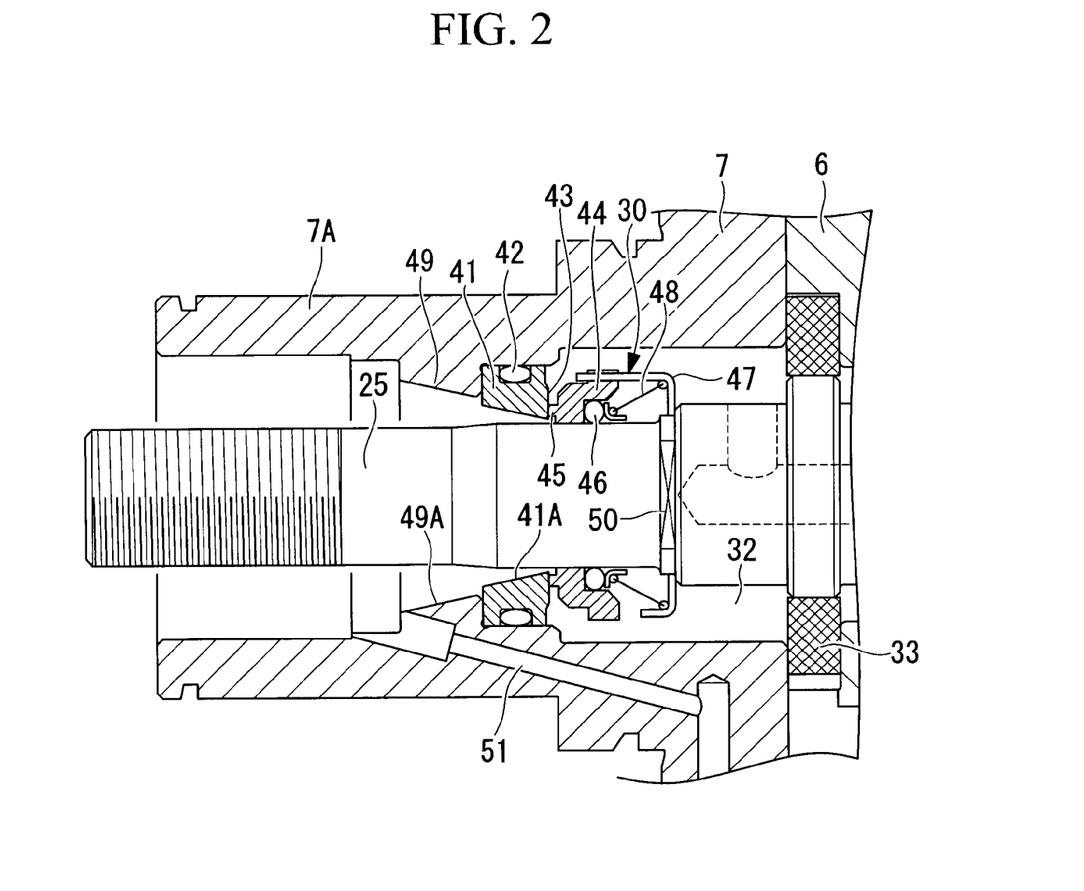
FIG. 2 is a vertical cross-sectional view of the drive unit housing portion of the scroll compressor shown in FIG. 1.

FIG. 2 shows a vertical cross-sectional view of the inner structure of the drive unit housing 7 portion. The mechanical seal 30 has an annular stationary ring 41, an annular rotary ring 44, a retainer 47, and a spring member 48. An O-ring 42 is fitted on the outer circumferential surface of the annular stationary ring 41, and the inner side face of the annular stationary ring 41 is formed to be a sliding surface 43. A sliding protuberance 45 that contacts and slides on the sliding surface 43 of the stationary ring 41 is provided on an outer side face of the rotary ring 44, and an O-ring 46 is fitted into the inner circumferential surface of the rotary ring 44. The retainer 47 retains the rotary ring 44 so that it can move in the direction of the shaft. The spring member 48 is interposed between the retainer 47 and the rotary ring 44.

An annular stepped portion 49 for securely fastening the stationary ring 41 of the mechanical seal 30 to drive unit housing 7 is provided in the inner circumferential surface of the boss portion 7A of the drive unit housing 7. The stationary ring 41 is inserted into the boss portion 7A through its flanged opening, and is properly positioned along the shaft direction and fixed by abutting it to the annular stepped portion 49. A hermetic seal is formed between the outer circumferential surface of the stationary ring 41 and the inner circumferential surface of the boss portion 7A by the O-ring 42. Meanwhile, the outer circumference of a portion of the rotating shaft 25 slightly in front of where the oil pump 33 is installed is cut away to form a stepped mounting surface 50. The rotary ring 44 and the retainer 47 of the mechanical seal 30 are inserted from the front end to the rotating shaft 25, and the retainer 47 is fitted to the stepped mounting surface 50, whereby the rotary ring 44 and the retainer 47 are properly positioned along the shaft direction and fixed to the outer circumference of the rotating shaft 25. A hermetic seal is formed between the inner circumferential surface of the stationary ring 44 and the outer circumferential surface of the rotating shaft 25 by the O-ring 46.

The boss portion 7A of the drive unit housing 7 is fitted to the front end portion of the rotating shaft 25 that protrudes from a front wall portion 8 of the front housing 6 with the stationary ring 41, the rotary ring 44, and the retainer 47, which make up the mechanical seal 30, installed and attached to the boss portion 7A and the rotating shaft 25 in the above-described manner. The drive unit housing 7 is fixed to the front housing 6 by bolts. Thereby, the sliding surface 43 of the stationary ring 41 and the sliding protuberance 45 of the rotary ring 44 are brought into contact with each other, urged by pressure from the spring member 47. Thereby, a contact sliding area is formed between the stationary ring 41 and the rotary ring 44, and the portion through which the rotating shaft 25 penetrates from the housing 2 to the outside (atmosphere) is shaft-sealed by the mechanical seal 30.

In addition, the boss portion 7A of the drive unit housing 7 is provided with an oil discharge hole 51 at the outer portion of the annular stepped portion 49, for guiding and discharging the lubricating oil that leaks out from the mechanical seal 30 to an external drain, not shown. Furthermore, the inner circumferential surface of the annular stepped portion 49 and the inner circumferential surface of the stationary ring 41 are provided with inclined portions 49A and 41A, respectively. The inclined portions 49A and 41A are provided so that the lubricating oil leaking from the mechanical seal 30 is guided to the oil discharge hole 51 quickly and does not remain around the stationary ring 41, discharged outside thereafter. The inclined portions 49A and 41A are provided so as to form a continuous surface, the inner diameter of the inner circumferential surface gradually increasing from the inner side to the outer side of the housing.

Hence, the present embodiment exhibits the following advantageous effects.

The mechanical seal 30 has a configuration in which the stationary ring 41 is securely fastened to the inner circumferential surface of the boss portion 7A and the rotary ring 44 is securely fastened to the outer circumferential surface of the rotating shaft 25 at an area to the inside of the stationary ring 41 so as to face the stationary ring 41. Therefore, when assembling, the mechanical seal may be assembled merely by fitting the rotating shaft 25 to which the rotary ring 44 has been fixed into the inner circumference of the stationary ring 41 fixed to the inner circumferential surface of the boss portion 7A of the drive unit housing 7. Thus, assembling of the compressor can be simplified.

Moreover, within the drive unit housing 7 to the inside of where the mechanical seal 30 is installed is the oil reservoir 32, which is filled with lubricating oil and also refrigerant during the operation of the compressor. This means that the entire outer circumferential surface of the mechanical seal 30 contacts with the lubricating oil in the oil reservoir 32, so the mechanical seal 30 is sufficiently lubricated and cooled. Furthermore, during the operation of the compressor, the rotary ring 44 of the mechanical seal 30 is rotated together with the rotating shaft 25, and the sliding protuberance 45 contacts with and slides on the sliding surface 43 of the stationary ring 41, thereby sealing the space between the two rings. At this time, the lubricating oil in the oil reservoir 32 is supplied to the contact sliding area from the outer circumference of the rotary ring 44 toward the center. In addition, although the mechanical seal 30 is cooled by the lubricating oil, the stationary ring 41 and the rotary ring 44 generate heat because of the contacting and sliding between the sliding surface 43 and the sliding protuberance 45. This heat generation tends to increase with use of a high pressure refrigerant.

Meanwhile, although the space between the stationary ring 41 and the rotary ring 44 is sealed by the sliding contact between the sliding surface 43 and the sliding protuberance 45, a very small amount of lubricating oil may leak from the contact sliding area at times. This leaked lubricating oil leaks to the inner circumferential surface side of the stationary ring 41 because the lubricating oil is supplied from the outer circumference of the rotary ring 44 toward the center. When this leaked oil stays around the inner circumferential surface of the stationary ring 41, there is a risk that the leaked oil may turn into sludge and form a deposit on the stationary ring 41 since the oil is exposed to a high temperature due to the heat generation. However, in the present embodiment, the inner circumferential surface of the stationary ring 41 and the inner circumferential surface of the annular stepped portion 49 are formed to have the inclined portions 41A and 49A, respectively, so that the inner diameter increases toward the outside. Therefore, the leaked lubricating oil is made to flow outward along the inclined portions 41A and 49A and is discharged through the oil discharge hole 51 to the outside.

Thus, even if a small amount of lubricating oil leaks out from the mechanical seal 30, the lubricating oil can be guided to the oil discharge hole 51 and discharged to the outside quickly by the inclined portions 41A and 49A. Therefore, the leaked oil does not stay around the stationary ring 41 and is not exposed to a high temperature. As a result, it is possible to solve the problems arising from the formation of the sludge from the leaked oil and deposition of the sludge, specifically, the problems of the prior art such as degradation in the shaft sealing capability and acceleration of lubricating oil leakage, which originate from the damage to the contact sliding parts caused by the sludge being caught between the contact sliding parts. The invention prevents leaked oil from turning into sludge, which is an advantageous effect especially since the current trend is toward increased use of a high pressure refrigerant, which increases the amount of heat generated at the contact sliding portions The above-described embodiment is an example in which the inner circumferential surface of the stationary ring 41 and the inner circumferential surface of the annular stepped portion 49 have the inclined portions 41A and 49A, respectively. However, such an inclined portion need be provided in one of the above, the stationary ring 41 or the annular stepped portion 49. Even when this latter configuration is employed, substantially the same advantageous effects as described above can be obtained.

The inclined portions 41A and 49A need not be provided over the entire circumference of the inner circumferential surface of the stationary ring 41 and the inner circumferential surface of the annular stepped portion 49. The purpose of the inclination can be accomplished by employing a configuration in which the inclined portions are provided in only in the gravitationally lower portions of the stationary ring 41 and the annular stepped portion 49. In this case, the inclined portions 41A and 49A may be configured so that a groove is provided in the gravitationally lower portions of the inner circumferential surface of the stationary ring 41 and the inner circumferential surface of the annular stepped portion 49 along the shaft axis line, and the bottom face of the groove gradually enlarges toward the outside in a tapered form.

Second Embodiment

Next, a second embodiment of the invention will be described with reference to FIG. 3.

The present embodiment differs from the foregoing first embodiment in that the structure of the stationary ring 41 of the mechanical seal 30 is partially changed. In other respects, this embodiment is the same as the first embodiment, so the description thereof will be omitted.

Figure 3:
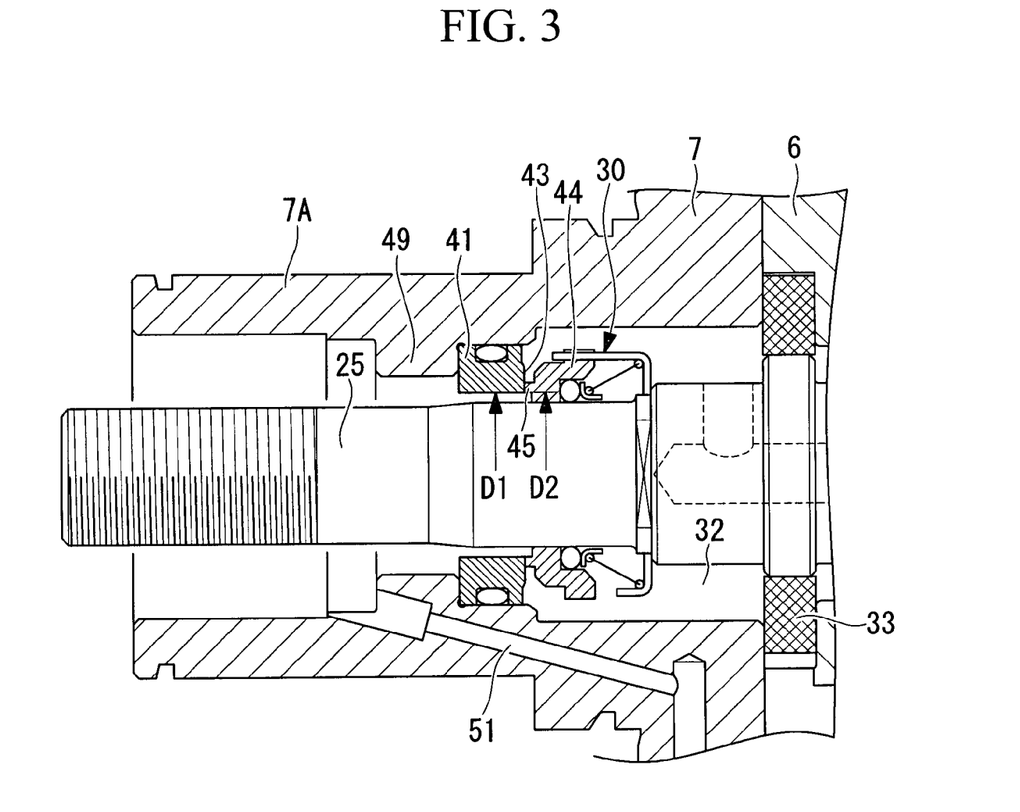
FIG. 3 is a vertical cross-sectional view of a drive unit housing portion according to a second embodiment of the invention.

FIG. 3 shows a vertical cross-sectional view of the inner structure of the drive unit housing 7 portion. In the present embodiment, the inner diameter D1 of the sliding protuberance 45 provided for the rotary ring 44 and the inner diameter D2 of the inner circumferential surface of the stationary ring 41 are made approximately equal to each other. The inner diameter D1 of the sliding protuberance 45 and the inner diameter D2 of the inner circumferential surface of the stationary ring 41 are preferably set so as to satisfy the expression $(D1-D2)/D1 \leq 0.07$.

In the above-described embodiment, the inner diameter D1 of the sliding protuberance 45 of the rotary ring 44 and the inner diameter D2 of the inner circumferential surface of the stationary ring 41 are made approximately equal to each other. Therefore, the lubricating oil leaking from the contact sliding portions at the inner circumferential surface of the stationary ring 41 does not stay in the space between the sliding protuberance 45 of the rotary ring 44 and the inner circumferential surface of the stationary ring 41. The oil is made to flow outward quickly and is discharged from the oil discharge hole 51 to the outside.

Therefore, in this embodiment, as well as in the first embodiment, the following advantageous effect can be exhibited. The leaked oil from the mechanical seal 30 does not stay around the stationary ring 41 and is not exposed to a high temperature. As a result, it is possible to prevent degradation in the shaft sealing capability and acceleration of lubricating oil leakage that are due to the leaked oil turning into sludge, building up, and being caught between the contact surfaces.

In particular, since the inner diameter D1 of the sliding protuberance 45 and the inner diameter D2 of the inner circumferential surface of the stationary ring 41 satisfy the expression $(D1-D2)/D1 \leq 0.07$, the recessed space formed between the sliding protuberance 45 of the rotary ring 44 and the inner circumferential surface of the stationary ring 41 is eliminated almost completely. Therefore, the leaked oil is prevented from remaining in the recessed space. It should be noted that, in FIG. 3, the inner circumferential surface of the stationary ring 41 and the inner circumferential surface of the annular stepped portion 49 are cylindrical surfaces, but it is possible to employ a configuration in which inclined portions similar to those described in the first embodiment are provided over the entire circumference or at least the gravitationally lower portions of the inner circumferential surface of the stationary ring 41 and the inner circumferential surface of the annular stepped portion 49.

Third Embodiment

Next, a third embodiment of the invention will be described with reference to FIG. 4.

The present embodiment has a different structure for transferring leaked oil from the mechanical seal 30 to the oil discharge hole 51 from that of the foregoing first embodiment. In other respects, this embodiment is the same as the first embodiment, so the description thereof will be omitted.

Figure 4:
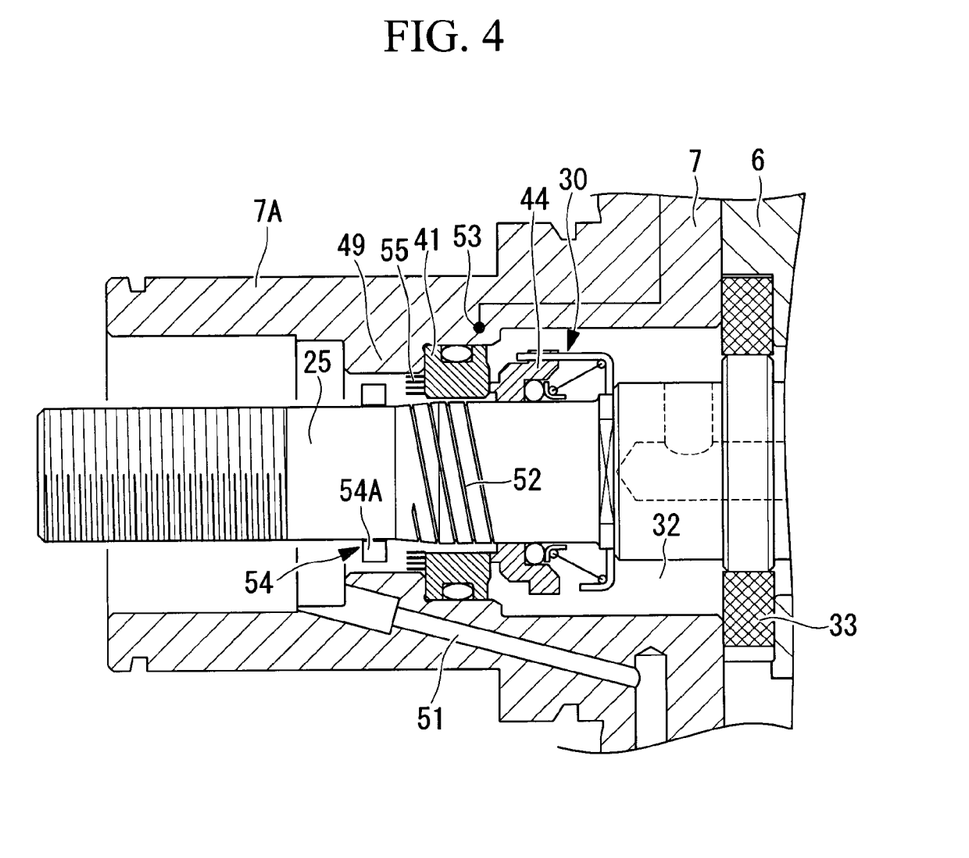
FIG. 4 is a vertical cross-sectional view of a drive unit housing portion according to a third embodiment through a sixth embodiment of the invention.

As shown in FIG. 4, the present embodiment has a configuration in which leaked oil is transported in a helical groove 52 on the outer circumferential surface of the rotating shaft 25 extending the entire way from the portion outward from where of the mechanical seal 30 is set to a position corresponding to the oil discharge hole 51 or a part thereof, by rotation of the rotating shaft 25.

With the above-described configuration, even if lubricating oil leaks out from between the contact sliding portions of the mechanical seal 30 to the inner circumferential side of the stationary ring 41, the leaked oil can be transferred through the helical groove 52 provided on the rotating shaft 25 quickly toward the oil discharge hole 51 so as to be discharged from the oil discharge hole 51 to the outside. Thus, in this embodiment as well, the leaked oil from the mechanical seal 30 does not remain around the stationary ring 41, so it is not exposed to a high temperature. Therefore, the leaked oil is not turned into sludge and deposited, and the sludge is not caught between the contact sliding portions. As a result, this embodiment can resolve the resulting problems caused by the sludge, such as degradation in the shaft sealing capability and acceleration of lubricating oil leakage. It should be noted that the helical groove 52 need not be a groove but may instead be a helical protrusion.

Fourth Embodiment

Next, a fourth embodiment of the invention will be described with reference to FIG. 4.

The present embodiment differs from the foregoing first embodiment in that the temperature increase in the vicinity of the stationary ring 41 of the mechanical seal 30 can be suppressed. In other respects, this embodiment is the same as the first embodiment, so the description thereof will be omitted.

As shown in FIG. 4, the present embodiment has a configuration in which a temperature sensor 53 is provided on the stationary ring 41 or in the vicinity of the installation location of the stationary ring 41 so that the rotation of the rotating shaft 25 can be controlled to be stopped or decelerated when the temperature of the stationary ring 41 or in the vicinity of the installation location of the stationary ring 41 that is detected by the temperature sensor 53 is equal to or higher than a predetermined temperature. The rotation of the rotating shaft 25 can be stopped by turning off the electromagnetic clutch 26. The rotation of the rotating shaft 25 can be decelerated by decelerating the rotation of the external drive source.

With the above-described configuration, rotation of the rotating shaft 25 is stopped or decelerated when the temperature of the stationary ring 41 or the vicinity of the installation location thereof becomes equal to or higher than a predetermined temperature. Therefore, the temperature increase in the vicinity of the stationary ring 41 caused by the heat generated by the contact sliding parts can be suppressed. Thus, even when the lubricating oil leaks out from between the contact sliding portions, the leaked oil does not stay around the stationary ring, so it is not exposed to a high temperature. Therefore, the leaked oil does not turn into sludge and build up, and the sludge is not caught between the contact sliding parts. As a result, it is possible to obtain the advantageous effect that the problems caused by the sludge, such as degradation in the shaft sealing capability and acceleration of lubricating oil leakage, can be resolved.

Fifth Embodiment

Next, a fifth embodiment of the invention will be described with reference to FIG. 4.

The present embodiment differs from the foregoing first embodiment in that it comprises a means for suppressing the temperature increase in the vicinity of the stationary ring 41 of the mechanical seal 30. In other respects, this embodiment is the same as the first embodiment, so the description thereof will be omitted.

As shown in FIG. 4, the present embodiment has a configuration in which a cooling means 54 is provided for cooling the stationary ring 41 and the rotary ring 44 by blowing outside air to the space at the outer side of the stationary ring 41 of the mechanical seal 30. This cooling means 54 may be constructed by providing a plurality of blower blades 54A on the outer circumference of the rotating shaft 25.

The above-described configuration makes it possible to forcibly cool the stationary ring 41 and the rotary ring 44 by blowing low temperature outside air to the stationary ring 41 and the rotary ring 44 from the outer side of the mechanical seal 30, thereby suppressing the temperature increase in the vicinity of the stationary ring 41 caused by heat generation by the contact sliding portions. Thus, in this embodiment as well, the leaked oil from the mechanical seal 30 does not remain around the stationary ring, so it is not exposed to a high temperature. Therefore, the leaked oil is not turned into sludge and deposited, and the sludge is not, caught between the contact sliding parts. As a result, this embodiment exhibits the advantageous effect that the problems caused by the sludge, such as degradation in the shaft sealing capability and acceleration of lubricating oil leakage, can be resolved. Moreover, the cooling means 54 may be configured easily, by merely attaching the blower blades 54A onto the rotating shaft 25.

Sixth Embodiment

Next, a sixth embodiment of the invention will be described with reference to FIG. 4.

The present embodiment differs from the foregoing first embodiment in that it comprises a means for suppressing the temperature increase in the vicinity of the stationary ring 41 of the mechanical seal 30. In other respects, this embodiment is the same as the first embodiment, so the description thereof will be omitted.

As shown in FIG. 4, the present embodiment is configured so that cooling fins 55 are provided integrally with or separately from the stationary ring 41, on the side of the stationary ring 41 opposite from the rotary ring and/or on the inner circumferential surface of the stationary ring 41. It should be noted that FIG. 4 illustrates an example in which cooling fins 55 formed separately from the stationary ring 41 are provided on the side of the stationary ring 41 opposite from the rotary ring.

The above-described configuration makes it possible to suppress the temperature increase in the vicinity of the stationary ring 41 by radiating the heat generated by the stationary ring 41 to the outer side through the cooling fins 55 provided on a side surface of the stationary ring 41 and/or the inner circumferential surface thereof. Thus, in this embodiment as well, the leaked oil from the mechanical seal 30 does not remain around the stationary ring where it is exposed to a high temperature. Therefore, the leaked oil is not turned into sludge and deposited, and the sludge is not caught between the contact sliding portions. As a result, this embodiment can resolve the resulting problems caused by the sludge, such as degradation in the shaft sealing capability and acceleration of lubricating oil leakage.

Seventh Embodiment

Next, a seventh embodiment of the invention will be described with reference to FIG. 5.

The present embodiment has a different structure of the oil discharge hole 51 from that of the foregoing first embodiment. In other respects, this embodiment is the same as the first embodiment, so the description thereof will be omitted.

Figure 5:
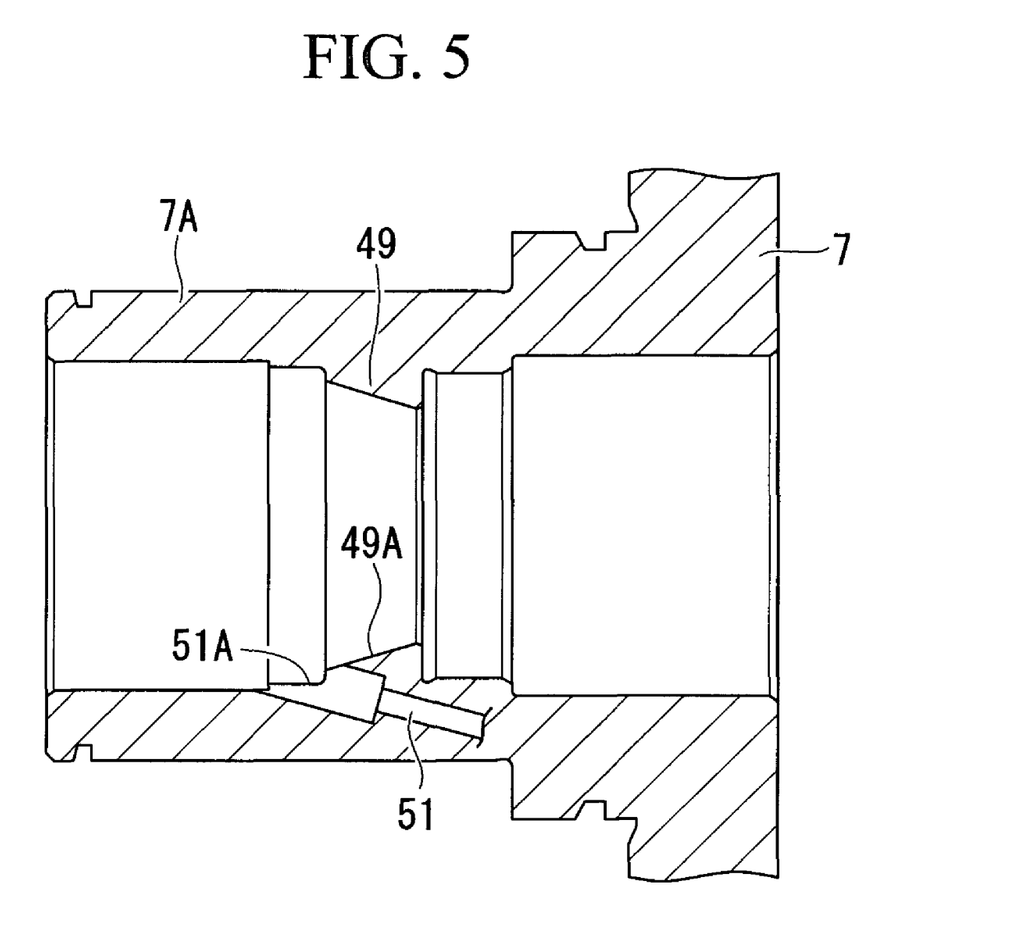
FIG. 5 is a vertical cross-sectional view of a boss portion of a drive unit housing portion according to a seventh embodiment of the invention.

FIG. 5 shows a vertical cross-sectional view of the boss portion 7A of the drive unit housing 7. The annular stepped portion 49 is provided in the inner circumferential side of the boss portion 7A of the drive unit housing 7 as described above, and the inclined portion 49A is provided over the entire inner circumference of the annular stepped portion 49. The oil discharge hole 51 for guiding leaked oil from the mechanical seal 30 to the external oil drain and discharging the oil to the outside is formed to the outer side of the annular stepped portion 49, in the boss portion 7A.

In the present embodiment, an opening 51A of the oil discharge hole 51 is provided in the middle of the inclined portion 49A of the inner circumferential surface of the annular stepped portion 49. Providing the opening 51A of the oil discharge hole 51 in the middle of the inclined portion 49A in this way makes it possible to discharge the leaked oil from the mechanical seal 30 that is moving in an outward direction along the inclined portion 49A in the annular stepped portion 49 with the oil receiving the influence of the centrifugal force caused by rotation of the rotating shaft 25 right up until it enters into the oil discharge hole 51 provided with the opening 51A in the inclined portion 49A. Therefore, the residence time of the leaked oil can be shortened further, and the leaked oil can be discharged to outside more quickly.

It should be noted that the foregoing embodiments are not to be construed to limit the present invention, and that the invention may be modified as appropriate without departing from the scope of the invention. For example, the foregoing embodiments have described the examples in which an oil reservoir space is provided to the inner side of the mechanical seal 30, but this space may be occupied by a refrigerant atmosphere mist which also includes, lubricating oil. In addition, the contact sliding portions are not limited to the sliding surface 43 and the sliding protuberance 45 provided in the stationary ring 41 and the rotary ring 44 of the mechanical seal 30, but may have other structures. For example, the sliding surface may be provided in the rotary ring while the sliding protuberance may be provided in the stationary ring. Furthermore, the foregoing embodiments may be used in combination as appropriate.

The invention claimed is:

1. A refrigerant compressor comprising a mechanical seal installed between an inner circumferential surface of a boss portion of a housing through which a rotating shaft penetrates and an outer circumferential surface of the rotating shaft and the mechanical seal shaft seals an inner side and an outer side of the housing; and an oil discharge hole provided to an outside of the mechanical seal of the boss portion and which discharges leaked oil to the outside, wherein
the mechanical seal comprises:
a stationary ring securely fastened to the inner circumferential surface of the boss portion; and
a rotary ring securely fastened to the outer circumferential surface of the rotating shaft to the inside of the stationary ring so as to face the stationary ring and to form a sliding contact between the sides of the stationary ring and the rotary ring that face each other, the rotary ring having an outer diameter smaller than an inner diameter of the boss portion, wherein
the inner circumferential surface of the boss portion to the outside of the stationary ring comprises an inclined portion in which the entire inner circumference or at least a gravitationally lower portion of the surface of the boss portion to the outside of the stationary ring enlarges from the stationary ring side toward the oil discharge hole located to the outside of the stationary ring, and
the stationary ring comprises a second inclined portion in which the entire inner circumference or at least a gravitationally lower portion of the inner circumferential surface of the stationary ring gradually enlarges from the rotary ring side toward the outer side.

2. The refrigerant compressor as set forth in claim 1, characterized in that: the inner circumferential surface of the boss portion comprises an annular stepped portion; the stationary ring is securely fastened to the inside of the annular stepped portion; and the inclined portion is provided within the inner circumferential surface of the annular stepped portion.

3. The refrigerant compressor as set forth in claim 1, characterized in that the inclined portion provided in the inner circumferential surface of the boss portion and the second inclined portion provided in the stationary ring provide a continuous surface.

4. The refrigerant compressor as set forth in claim 1, characterized in that the oil discharge hole is provided so as to open in the inclined portion.

5. A refrigerant compressor comprising:
a mechanical seal installed between an inner circumferential surface of a boss portion of a housing through which a rotating shaft penetrates and an outer circumferential surface of the rotating shaft, the mechanical seal shaft seals an inner side and an outer side of the housing; and
an oil discharge hole which is provided to an outside of the mechanical seal of the boss portion and which discharges leaked oil to the outside, wherein:
the mechanical seal comprises:
a stationary ring securely fastened to the inner circumferential surface of the boss portion; and
a rotary ring securely fastened to the outer circumferential surface of the rotating shaft to the inside of the stationary ring so as to oppose the stationary ring and to form a sliding contact between the sides of the stationary ring and the rotary ring that face each other wherein,
an inner diameter of a contact sliding portion of the rotary ring and an inner diameter of a gravitationally lower portion of the inner circumferential surface of the stationary ring are substantially equal to each other, and
the stationary ring comprises an inclined portion in which an entire inner circumference or at least a gravitationally lower portion of the inner circumferential surface of the stationary ring gradually enlarges from the rotary ring side toward the outer side.

6. The refrigerant compressor as set forth in claim 5, characterized in that the inner diameter of the entire circumference or of at least a gravitationally lower portion of the inner circumferential surface of the stationary ring gradually enlarges from the rotary ring side toward the oil discharge hole to the outside of the stationary ring.

7. The refrigerant compressor as set forth in claim 5, characterized in that the expression $(D1-D2)/D1 \leqq 0.07$ is satisfied, where D1 is the inner diameter of the contact sliding part of the rotary ring and D2 is the inner diameter of the entire inner circumference or at least the gravitationally lower portion of the inner circumferential surface of the stationary ring.

8. A refrigerant compressor comprising a mechanical seal installed between an inner circumferential surface of a boss portion of a housing through which a rotating shaft penetrates and an outer circumferential surface of the rotating shaft and the mechanical seal shaft seals an inner side and an outer side of the housing; and an oil discharge hole provided to an outside of the mechanical seal of the boss portion and which discharges leaked oil to the outside, wherein
the mechanical seal comprises a stationary ring securely fastened to the inner circumferential surface of the boss portion, and a rotary ring securely fastened to the outer circumferential surface of the rotating shaft to the inside of the stationary ring so as to face the stationary ring and to form sliding contact between the sides of the stationary ring and the rotary ring that face each other; and
the rotating shaft has a helical portion through which the leaked oil can be transported to the oil discharge hole by rotation of the rotating shaft, the helical portion provided in an entirety or a portion of a section of the outer circumferential surface of the rotating shaft extending from a position outside of the position at which the rotary ring is installed to the oil discharge hole.

9. A refrigerant compressor comprising a mechanical seal installed between an inner circumferential surface of a boss portion of a housing through which a rotating shaft penetrates and an outer circumferential surface of the rotating shaft and the mechanical seal shaft seals an inner side and an outer side of the housing; and an oil discharge hole provided to an outside of the mechanical seal of the boss portion and which discharges leaked oil to the outside, wherein
the mechanical seal comprises:
a stationary ring securely fastened to the inner circumferential surface of the boss portion; and
a rotary ring securely fastened to the outer circumferential surface of the rotating shaft to the inside of the stationary ring so as to face the stationary ring and to form sliding contact between the sides of the stationary ring and the rotary ring that face each other, the rotary ring having an outer diameter smaller than an inner diameter of the boss portion, wherein a temperature sensor is provided on the stationary ring or in the vicinity of the installation location thereof, and rotation of the rotating shaft is stopped or decelerated when the detected value of the temperature sensor is equal to or higher than a predetermined temperature, and the stationary ring comprises an inclined portion in which an entire inner circumferential surface or at least a gravitationally lower portion of the inner circumferential surface of the stationary ring gradually enlarges from the rotary ring side toward the outer side.

10. A refrigerant compressor comprising:

a mechanical seal installed between an inner circumferential surface of a boss portion of a housing through which a rotating shaft penetrates and an outer circumferential surface of the rotating shaft and the mechanical seal shaft seals an inner side and an outer side of the housing; and an oil discharge hole provided to an outside of the mechanical seal of the boss portion and which discharges leaked oil to the outside, wherein the mechanical seal comprises a stationary ring securely fastened to the inner circumferential surface of the boss portion, and a rotary ring securely fastened to the outer circumferential surface of the rotating shaft to the inside of the stationary ring so as to face the stationary ring and to form sliding contact between the sides of the stationary ring and the rotary ring that face each other, the rotary ring having an outer diameter smaller than an inner diameter of the boss portion, wherein cooling means for cooling the stationary ring and the rotary ring of the mechanical seal is provided to the outside of the stationary ring, and the stationary ring comprises an inclined portion in which an entirety of an inner circumferential surface or at least a gravitationally lower portion of the inner circumferential surface of the stationary ring gradually enlarges from the rotary ring side toward the outer side.

11. The refrigerant compressor as set forth in claim 10, characterized in that the cooling means comprises blower blades attached to the rotating shaft.

12. A refrigerant compressor comprising a mechanical seal installed between an inner circumferential surface of a boss portion of a housing through which a rotating shaft penetrates and an outer circumferential surface of the rotating shaft and the mechanical seal shaft seals an inner side and an outer side of the housing; and an oil discharge hole provided to an outside of the mechanical seal of the boss portion and which discharges leaked oil to the outside, wherein the mechanical seal comprises a stationary ring securely fastened to the inner circumferential surface of the boss portion, and a rotary ring securely fastened to the outer circumferential surface of the rotating shaft to the inside of the stationary ring so as to face the stationary ring and to form sliding contact between the sides of the stationary ring and the rotary ring that face each other;

cooling fins are provided on the side of the stationary ring opposite from the rotary ring or the inner circumferential surface of the stationary ring, integrally with or separately from the stationary ring, and the stationary ring comprises an inclined portion in which an entirety of an inner circumferential surface or at least a gravitationally lower portion of the inner circumferential surface of the stationary ring gradually enlarges from the rotary ring side toward the outer side.

* * * * *